March 9, 1937. H. D. SCHWARZBAUM ET AL 2,073,497
SPRING SUSPENSION FOR A BABY CARRIAGE BODY
Filed Aug. 8, 1936 2 Sheets-Sheet 1
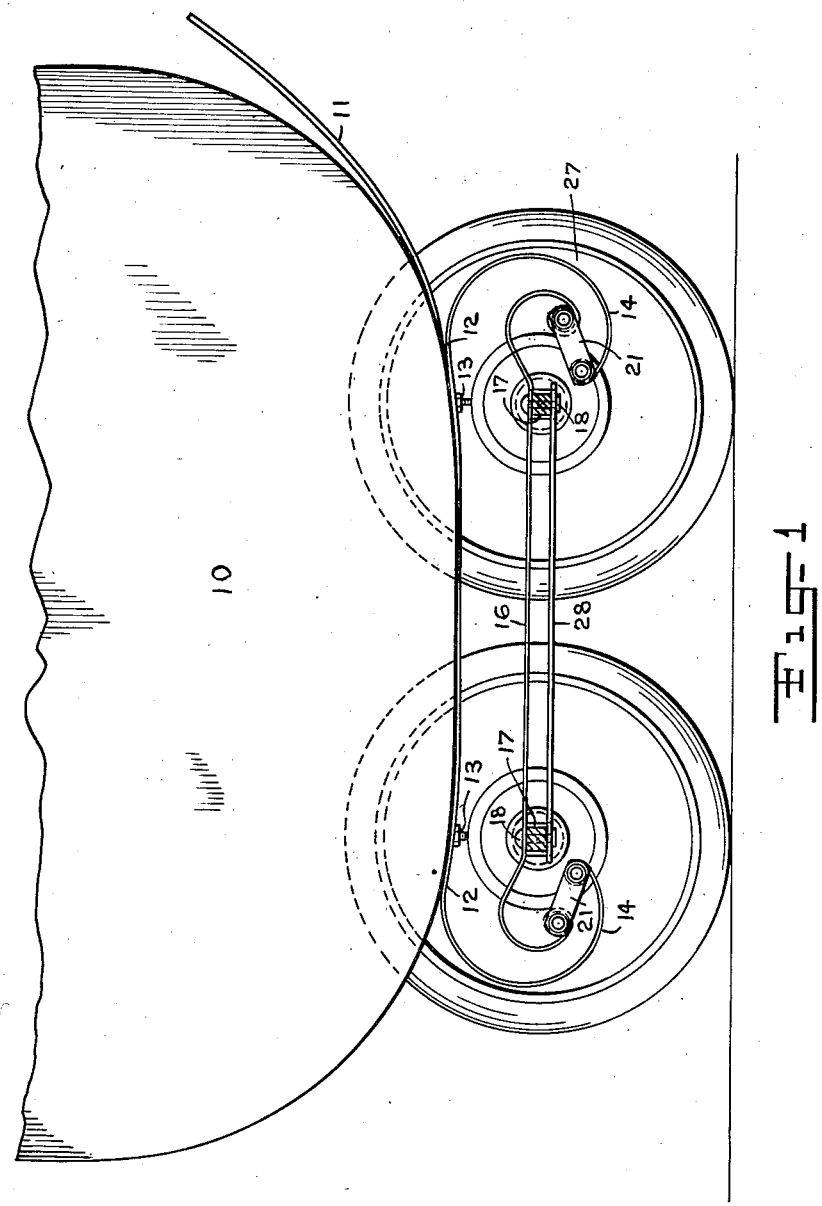

March 9, 1937. H. D. SCHWARZBAUM ET AL 2,073,497
SPRING SUSPENSION FOR A BABY CARRIAGE BODY
Filed Aug. 8, 1936 2 Sheets-Sheet 2
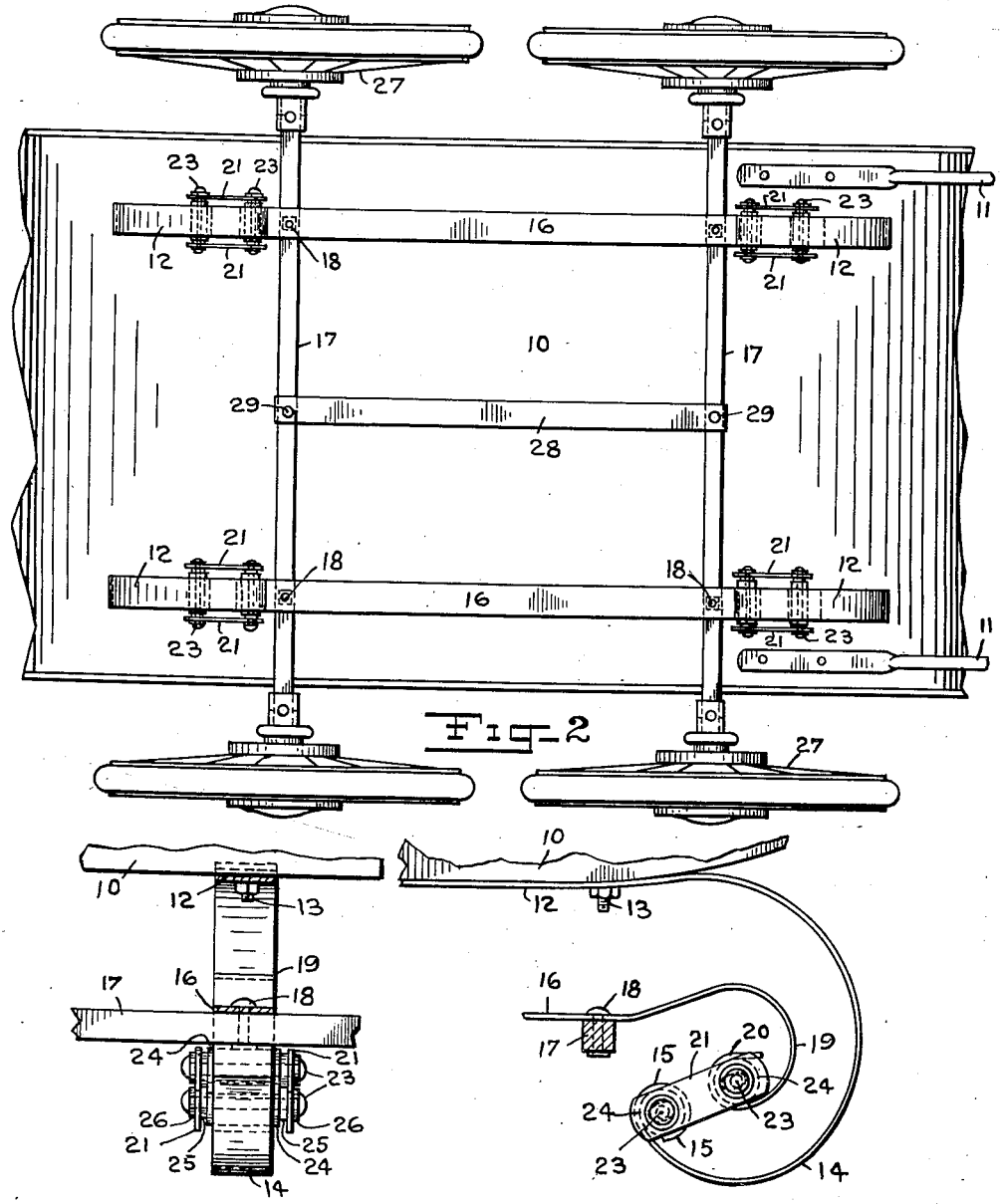

Patented Mar. 9, 1937

2,073,497

UNITED STATES PATENT OFFICE 2,073,497

SPRING SUSPENSION FOR A BABY CARRIAGE BODY

Hartley D. Schwarzbaum, New York, N. Y., and Edward C. Keyworth, Gardner, Mass., assignors to Bilt-Rite Baby Carriage Co., Brooklyn, N. Y., a firm composed of Meyer S. Harrison and Elias Specter Application August 8, 1936, Serial No. 94,980

7 Claims. (Cl. 280—47)

Our invention relates to an improvement in a gear or spring suspension for a baby carriage body and its novelty consists in the arrangement and adaptation of parts as will be more fully hereinafter pointed out.

It has been a real problem for many years to find a gear or spring suspension for suspending a baby carriage body on the chassis in a manner that will insure ease in operation and long life to the combined carriage and chassis.

Our novel spring suspension insures complete ease in the movement of the carriage in any and every direction as the baby jumps around therein or in passing over rough ground and also prevents too much or too rapid movement thereby insuring easy going steadiness to the motion of the carriage. Said spring construction also permits a closer setting of the body and wheels and a narrower carriage for entering narrow doorways. Referring to the drawings Figure 1 is a side elevation of a baby carriage embodying our device and with the upper part of the body broken away for convenience in illustration and the axles cut so as to eliminate the near wheels and gearing and show the remainder more clearly.

Figure 2 is a bottom plan view of the gear and carriage with ends of the body broken away for convenience in illustration.

Figure 3 is a detail of one end of the gearing.

Figure 4 is the same as Figure 3 looking in from the left hand side.

Figure 5 is a single shackle plate.

Figure 6 is the rubber cylinder used over the bolts of the shackle.

In the drawings 10 is a baby carriage body having the usual handle 11 and being supported on a pair of members 12 which are rigidly secured to the bottom of said body 10 along either longitudinal side by bolts 13. Said members 12 have a large outwardly and downwardly turned circular spring portion 14 near each end which terminate at their ends in shackle suspending circular ends 15. A second pair of members 16 are rigidly secured to axles 17 by bolts 18 and said members 16 have a small downwardly turned circular portion 19 near each end which terminate at their ends in shackle suspending circular ends 20.

The adjacent circular ends 15 and 20 are secured together by means of shackles having side plates 21 with holes 22 which are sufficiently larger circularly or elliptically than rivets 23 to permit of some movement of said rivets 23 in said holes 22. A rubber cylinder 24 is mounted over said rivets 23 and metal spacer members 25 are mounted over said rivets 23 adjacent each end of the rubber cylinder 24. Also there are metal washers 26 between the plates 21 and the head ends of rivets 23, so that the contacting wearing portions of said shackles are metal and the ends 15 and 20 of the springs 16 hook over and rest and have more movement on the rubber cylinders 24.

Wheels 27 are mounted on each end of the axles 17 in the usual way. Also a reinforcing bar 28 is rigidly secured to the central part of each of the axles 17 at 29.

In operation the spring portions 19 terminating in shackle suspending circular ends 20 serve as pivots and furnish a free movement to the spring portion 14 through the free swing of the shackles as connected to the shackle supports 15. In this way, because of the movement of the shackles as pivoted in the circular ends 20 with the free ends 15, the spring portions 14 of members 12 are enabled to flex more easily but less violently with actually more movement as the free ends 15 swing with the movement of the shackles pivoted at 20.

This connection of the spring portions 14 and 19 by means of the shackles at the shackle supporting ends 15 and 20 also permits of side motion as the ends 15 and 20 are mounted over the rubber cylinder 24 and the rivets 23 have a leeway of movement in all directions in the oversized circular or elliptical holes 22 of the shackle plates 21.

Therefore the structure of the spring portion 14 coming over and around the spring portions 19 and their ends being connected at their shackle supporting circular ends 15 and 20 by shackles as described, insures easy going and complete movement of the carriage body 10 supported thereon in any and every direction including universal motion.

Also it is to be noted that practically all of the noise in the movement of the springs 14 and 19 and the shackles connecting same is eliminated because of the use of the cylindrical rubber members 24 over the rivets 23 of said shackles and also the contacting of the shackle supporting circular ends 15 and 20 around said cylindrical rubber members 24.

We claim:

1. In a baby carriage a body, a pair of members rigidly secured to the same thereunder and supporting the same and having large downward circular spring portions at each end and terminating in shackle supports, a second pair of members rigidly secured to the axles of a chassis having smaller downturned circular spring portions at each end curving within said large circular members of said first pair of spring portions and terminating in shackle supports, and shackles having a pair of elliptical holed plates loosely fastened together for free play connecting each of said adjacent pairs of shackle supports so as to allow free universal movement of said shackle supports.

2. In a baby carriage a body, a pair of members rigidly secured to the same thereunder and supporting the same and having large downturned circular spring portions at each end and terminating in shackle supports, a second pair of members rigidly secured to the axles of a chassis having smaller downturned circular spring portions at each end curving within said large circular members of said first pair of spring portions and terminating in shackle supports and shackle means connecting each of said adjacent pairs of shackle supports, so as to allow free universal movement of said shackle supports comprising shackles having a pair of plates riveted together, with some play and a rubber cylinder mounted over each of said rivets between said plates.

3. In a carrier a body, a pair of members rigidly secured to the same thereunder and supporting the same and having large downturned circular spring portions at each end and terminating in shackle supporting members, a second pair of members rigidly secured to said body supporting base and having smaller downturned circular spring portions at each end curving within said larger circular members of said first pair of spring portions and terminating in shackle supports, shackles connecting each of said adjacent pairs of shackle supports and resilient means interposed between said shackles and supports so as to permit free quiet universal movement therebetween.

4. In a carrier a body, a pair of members each rigidly secured along the longitudinal edge of the bottom of said body and supporting the same and having circular spring portions at each end and terminating in shackle supports, a second pair of members rigidly secured to said body supporting base and having circular portions at each end curved within said circular members of said first pair of spring portions and terminating in shackle supports, and shackle means connecting each of said adjacent pairs of shackle supports so as to allow free universal movement of said shackle supports, comprising shackles having a pair of plates with circular oversized free play holes for rivets.

5. In a baby carriage a body, a pair of supporting members rigidly secured to the bottom of said body, large downturned outwardly curving circular spring portions at the ends of said members, a second pair of members rigidly secured to a chassis and having downturned spring portions at each end curving within said first pair of spring portions and shackles connecting the adjacent ends of said two pairs of spring portions so as to allow free universal movement of said spring portions, comprising shackles having a pair of elliptical holed plates riveted together, and a rubber cylinder mounted over each of said rivets between said plates.

6. In a carrier a body, a pair of supporting members rigidly secured to the bottom of said body, large downwardly and outwardly curving circular spring portions near the ends of said members, a second pair of members rigidly secured to a body supporting base having spring portions curving within said first pair of spring portions and shackle means connecting the adjacent ends of said two pairs of spring portions so as to allow free universal movement of said spring ends comprising shackles having a pair of plates riveted together with free play and a rubber cylinder mounted over each of said rivets between said plates.

7. In a baby carriage body, a pair of supporting members rigidly secured to the bottom of said body along the longitudinal edges of the same, downwardly and outwardly curving circular spring portions near the ends of said members terminating in small circular shackle supporting members, a second pair of members rigidly secured to a chassis having spring portions curving within said first pair of spring portions and terminating at each end in a small circular shackle supporting member so as to permit free universal movement of said shackle supports, and comprising shackles connecting the adjacent ends of said two pairs of spring portions, said shackles being riveted together so as to permit some play and having rubber cylinders mounted over each of the rivets and over which said circular shackle supporting members are mounted.

HARTLEY D. SCHWARZBAUM.
EDWARD C. KEYWORTH.